Patented Apr. 17, 1923.

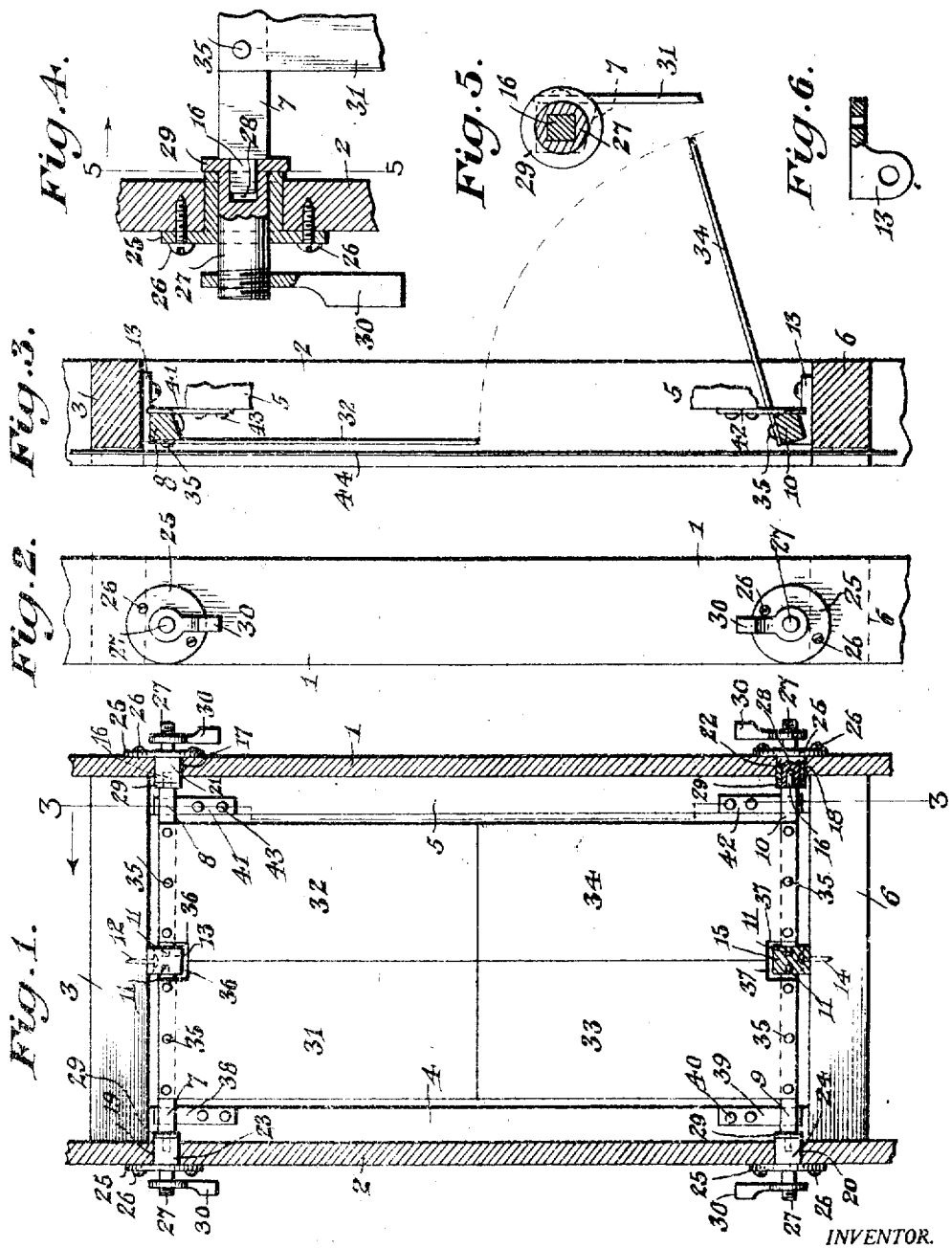

1,451,956

UNITED STATES PATENT OFFICE.

ARLIE PAYNE, OF PARAGOULD, ARKANSAS.

CAMERA ATTACHMENT.

Application filed March 5, 1920. Serial No. 363,582.

*To all whom it may concern:*

Be it known that I, ARLIE PAYNE, a citizen of the United States, residing at Paragould, in the county of Greene and State of Arkansas, have invented certain new and useful Improvements in Camera Attachments, of which the following is a specification.

This invention relates to a camera attachment and more specifically to a new and improved multiplying attachment adapted for use in connection with box or folding cameras whereby a plurality of exposures may be taken on one plate.

One of the objects of my invention therefore resides in a novel arrangement of swinging doors or shutters for exposing to view different sections of a sensitive plate and means for operating said doors independently of each other whereby one, two, three or four exposures may be produced in cooperation with a view finder, it being understood that the objects to be photographed will be disposed in such relative positions as to conform to that portion of the camera through which light is to be admitted.

Another and very important object of my invention resides in the novel arrangement and operation of a plurality of independently operable doors for the above purpose capable of use in connection with the commercial camera, without materially reconstructing or rearranging its parts.

With these objects in view and others which will be manifest and suggested as the nature and purpose of my invention are revealed in the following specification and drawing wherein I have shown a practical, yet preferred embodiment thereof.

In the drawing:—

Figure 1 is a rear elevation partly in section, showing the doors or shutters applied to a box camera.

Figure 2 is a side view of Figure 1.

Figure 3 is a section taken on line 3—3, Figure 1, with the lower shutters open.

Figure 4 is a fragmentary view partly in section, showing the door or shutter and its operating means.

Figure 5 is a section on line 5—5, Figure 4.

Figure 6 is a side view, partly in section, of a bearing element.

Referring to the drawing in detail, wherein like reference characters denote corresponding parts throughout the several views, 1 and 2 denote the sides of an ordinary camera body and arranged within the latter is a frame comprising a top bar 3, side bars 4, 5, and a bottom bar 6.

An attachment in accordance with this invention, is supported by the sides 1, 2, and the bars of said frame and such attachment comprise a pair of upper shafts 7, 8, and a pair of lower shafts 9, 10. Each of the said shafts is polygonal in contour. The shafts 7, 8, oppose each other and are arranged in lengthwise alignment and are positioned near the top of the camera body at the rear thereof. The shafts 9, 10, oppose each other and are positioned in lengthwise alignment and are arranged at the bottom of the camera body at the rear thereof. The inner end of each of the shafts is reduced to provide a journal 11.

Secured to the top bar 3, by the hold-fast device 12, and further depending from said top bar 3, is an upper bearing 13 for the journals 11, formed on the inner ends of the shafts 7, 8.

Secured to the bottom bar 6, by the hold-fast device 14, and projecting upwardly from said bar 6, is a bottom bearing 15 for the journals 11, at the inner ends of the shafts 9 and 10.

The outer end of each of the shafts 7, 8, 9 and 10, is formed with a reduced polygonal extension 16, more clearly shown in Figure 4, and which is employed for coupling the shaft with an actuating means therefor.

The side 1 of the camera body, near the top thereof, is formed with a cylindrical opening 17, and is also provided near its bottom with a cylindrical opening 18. The side 2 of the camera body is formed with a cylindrical opening 19, and near its bottom with a cylindrical opening 20. Mounted in the openings 17, 18, 19 and 20, are cylindrical bearing sleeves 21, 23, 23, 24 respectively, which project inwardly with respect to the sides of the camera body and each of which has its outer end provided with a flange 25 bearing against the outer face of a side of the camera body and fixedly secured to the side, through the medium of hold-fast devices 26.

The actuating or opening means for each of the shafts, consists of a cylindrical member 27, which is mounted in a bearing sleeve, which projects inwardly as well as outwardly from the sleeve and which has its inner end provided with a polygonal shaped socket 28, corresponding in contour to the reduced end 16. The inner end of the member 27 is provided with a collar 29 which is interposed between the enlarged portion of the shaft and the inner end of the bearing sleeve which is clearly shown in Figure 4. The outer end of the member 27 has secured thereto a handle-piece 29 for the purpose of shifting the shaft when desired. The extensions 16 are mounted in the sockets 28.

Secured to the shaft 7 and depending therefrom is a door or shutter 31. Secured to the shaft 8 and depending therefrom is a door or shutter 32. Secured to the shaft 9 and extending upwardly therefrom is a door or shutter 33, and secured to the shaft 10 and extending upwardly therefrom is a door or shutter 34. Each of the doors 31, 32, 33 and 34, is rectangular in contour and is secured to one of the side faces of a shaft, by the hold-fast devices 35. The inner longitudinal edges of the doors 31, 32, are arranged in close proximity to each other, and the inner longitudinal edges of the doors 33, 34 are arranged in close proximity to each other. The bottom edges of the doors 31, 32, are arranged in close proximity to the upper edges of the doors 33, 34. To provide a clearance for the upper bearing 13, the doors 31, 32, are cut away at one corner thereof, as indicated at 36, and to provide a clearance for the lower bearing 15, the doors 33, 34, are cut away at one corner, as at 37.

Bearing against each of the shafts, so as to prevent the accidental shifting thereof, is an elongated flat spring. The springs for the shafts 7 and 9 are indicated at 38, 39 respectively, and are secured by the hold-fast devices 40 to the side bar 4. The springs for the shafts 8 and 10 are indicated at 41, 42 respectively and are secured to the side bar 5 by the hold-fast devices 43. The springs normally bear against one of the sides of the shafts. The springs 38 and 41 extend above the shafts 7 and 8, and the springs 39 and 42 depend below the shafts 9 and 10. The springs as before stated act to prevent the accidental shifting of the shafts and further act to maintain the doors or shutters in closed position.

From the foregoing construction, it is apparent that by shifting any one or all of the handle members 30, the respective doors or shutters will be opened and different exposures had on the sensitive plate or film 44.

It will be understood of course, that the doors or shutters are operated in conjunction with a view finder, not shown, of any suitable construction when the object is focused in any portion thereof and when the object is focused the proper door or doors will necessarily be opened.

Having shown and described my invention, what I claim as new and desire to secure by Letters Patent of the United States is:—

1. A multiplying attachment for cameras comprising an upper pair of lengthwise aligning shafts, one independently operable with respect to the other, a lower pair of lengthwise aligning shafts, one independently operable with respect to the other, each of said shafts consisting of a polygonal shaped body portion and inner and outer cylindrical terminals, an upper bearing member adapted to be secured to the upper end of the camera body and having mounted therein the opposed inner terminals of the upper pair of shafts, a lower bearing member adapted to be secured to the rear end of the camera body and having mounted therein the opposed inner terminals of the lower pair of shafts, a shutter secured to one of the sides of the body portion of each of said shafts and having one corner thereof cut away to provide a clearance for a bearing member, bearing elements adapted to be arranged in the sides of the camera body and each having an outer end terminal of a shaft journaled therein, flat holding springs adapted to be secured within the camera body and each bearing against the polygonal body portion of a shaft, and means connected to the outer terminals of said shaft for manually operating them.

2. The combination with a camera body of a plurality of independently operable shafts extending transversely thereof and each having a polygonal shape body portion formed with an inner and outer cylindrical terminal, bearings secured within said camera body for the said inner terminals, bearings secured at the sides of said camera body at said outer terminals, a shutter secured at one end to one of the flat faces of the body portion of each of said shafts, a holding spring for each shaft, said springs secured to and within the camera body and each bearing against the polygonal body portion of the shaft to hold the latter, said shutters cut away to provide clearances for the bearings of the inner terminals of the shafts, and means for manually operating each of the shafts.

3. The combination with a camera body of a plurality of independently operable shafts extending transversely thereof and each having a polygonal-shaped body portion formed with an inner and an outer cylindrical terminal, bearings within said camera body for said inner terminals, bearings secured to the sides of the camera body for said outer terminals, a shutter secured at one end to one of the flat faces of the body portion of each of said shafts, a holding spring for each shaft, said springs secured to and within the camera body and each bearing against the polygonal-shaped body portion of the shaft to hold the latter, and means for manually operating each of the shafts.

ARLIE PAYNE.